US005982366A

United States Patent [19]

Nakase

[11] Patent Number: 5,982,366

[45] Date of Patent: Nov. 9, 1999

[54] CURSOR MEMORY

[75] Inventor: Yasunobu Nakase, Tokyo, Japan

[73] Assignee: Mitsubishi Denki Kabushiki Kaisha, Tokyo, Japan

[21] Appl. No.: 08/912,637

[22] Filed: Aug. 18, 1997

[30] Foreign Application Priority Data

Mar. 27, 1997 [JP] Japan .................................... 9-074954

[51] Int. Cl.[6] ........................................................ G06F 15/20

[52] U.S. Cl. ............................................ 345/339; 345/145

[58] Field of Search .................................... 345/359, 333, 345/326–332, 340–347, 348, 349, 350–351, 352–357; 395/111–112, 110, 102, 114–115, 117, 101, 116

[56] References Cited

U.S. PATENT DOCUMENTS 4,868,548 9/1989 Gelvin .
4,987,411 1/1991 Ishigami ................................... 340/709
5,295,254 3/1994 Ogawa .
5,313,577 5/1994 Meinerth et al. ....................... 345/339
5,321,806 6/1994 Meinerth et al. ....................... 345/339
5,737,502 4/1998 Shimada .................................. 395/110

FOREIGN PATENT DOCUMENTS 64-46851 2/1989 Japan .

OTHER PUBLICATIONS

1994 IEEE International Solid–State Circuits Conference "A 320 MHz CMOS Triple 8b DAC with On–Chip PLL and Hardware Cursor", David Reynolds, pp. 50–51.

1993 IEEE Custom Integrated Circuits Conference "A 200–MHz 8–kb SRAM Macro For Video Applications", Todd Williams, et al., pp. 25.6.1 to 25.6.3.

*Primary Examiner*—Steven Sax
*Attorney, Agent, or Firm*—Burns, Doane, Swecker & Mathis, LLP

[57] ABSTRACT

First and second pattern data constituting cursor pattern data are stored separately in banks (101*a*, 101*b*). A cursor memory body (101) simultaneously outputs the first and second pattern data from the banks (101*a*, 101*b*). Therefore, a read circuit (102) can simultaneously output the first and second pattern data through a port (P2) with a simple control. With this configuration, an easy-controllable cursor memory can be provided.

16 Claims, 7 Drawing Sheets

CURSOR MEMORY

BACKGROUND OF THE INVENTION

1. Field of the Invention

The present invention relates to a cursor memory which stores data representing a cursor pattern (referred to as "pattern data" hereinafter).

2. Description of the Background Art

First of all, a cursor pattern is a pattern that is displayed on a monitor and moves thereon in accordance with mouse operation and the like. A typical example of the cursor pattern is shown in FIG. 7. The cursor pattern CUR_P of FIG. 7 is constituted by 64×64 pixels. Discussion will be presented below, using the cursor pattern CUR_P.

A structure of pattern data CUR_D which represent the cursor pattern CUR_P will be discussed. FIG. 8 is a schematic view showing the structure of the pattern data CUR_D. Each pixel of the cursor pattern CUR_P is expressed by using two bits (a shallow bit and a deep bit). Pattern data CUR_D0 is a set of shallow bits, which is constituted by 64×64 bits in total (64 bits in a vertical direction and 64 bits in a horizontal direction). Pattern data CUR_D1 is a set of deep bits, which is constituted by 64×64 bits in total (64 bits in a vertical direction and 64 bits in a horizontal direction). For example, a pixel P00 of FIG. 7 is expressed by a shallow bit P00_0 in the pattern data CUR_D0 of FIG. 8 and a deep bit P00_1 in the pattern data CUR_D1.

Each pixel of the cursor pattern CUR_P, which employs two bits, can express four kinds of colors. For example, it expresses transparent, red, black and green when the combination of the shallow bit and the deep bit is 0:0, 0:1, 1:0 and 1:1, respectively.

A cursor memory is a dual port memory for storing the pattern data CUR_D. A dual port memory has two ports, each of which performs either or both of input and output of data.

FIG. 9 is a block diagram showing a configuration of a background-art cursor memory 200 used for the cursor pattern CUR_P.

The configuration of the cursor memory 200 will be discussed. The cursor memory 200 comprises a cursor memory body 201 for storing the pattern data CUR_D, a read circuit 202 for performing read of the pattern data CUR_D0 and the pattern data CUR_D1 from the cursor memory body 201 and a read/write circuit 203 for performing read and write of the pattern data CUR_D0 and the pattern data CUR_D1 from and to the cursor memory body 201.

The cursor memory body 201 has the following configuration as the pattern data CUR_D are inputted or outputted in units of 32 bits through a read/write port P1. The cursor memory body 201 includes planes P_0 and P_1 for storing the pattern data CUR_D0 and the pattern data CUR_D1, respectively. Each of the planes P_0 and P_1 is a memory cell array of 64 rows and 64 columns. In each row of the memory cell array, an address is allocated every 32 columns. Specifically, addresses #0 to #127 are allocated in the plane P_0 and addresses #128 to #255 are allocated in the plane P_1. At each address, 32 bits of data are stored.

The read/write circuit 203 comprises the read/write port P1 used for input and output of the pattern data CUR_D0 and CUR_D1. The read/write port P1 includes 32 terminals and performs input and output of the pattern data CUR_D in units of 32 bits through the 32 terminals.

The read circuit 202 comprises a multiplexer MUX, shift registers SR0 and SR1, a read port P2 and a control circuit CTL2.

The read port P2 performs only output of the pattern data CUR_D and includes two terminals for clear discrimination between the pattern data CUR_D0 and the pattern data CUR_D1.

The read circuit 202 outputs the pattern data CUR_D0 and CUR_D1 to the two terminals of the read port P2 respectively by bit. Accordingly, the cursor memory body 201 may fundamentally have a configuration to output the pattern data CUR_D0 and the pattern data CUR_D1 by bit. For effective use of circuit area, however, the cursor memory body 201 has a configuration to output data to the read circuit 202 in units of 32 bits (one address of data) in accordance with the 32-bit output to the read/write circuit 203.

The multiplexer MUX receives the 32 bits of data read by the cursor memory body 201. The multiplexer MUX outputs the received 32 bits of data to the shift register SR0 when the 32 bits of data are the pattern data CUR_D0 and to the shift register SRI when the 32 bits of data are the pattern data CUR_D1. The shift registers SR0 and SR1 output the pattern data CUR_D0 and CUR_D1, respectively, to the read port P2 by bit in accordance with a clock (not shown) supplied from the outside of the cursor memory 200.

The input/output operation through the read/write port P1 is performed on one of the pattern data CUR_D0 and CUR_D1. In contrast, the output operation through the read port P2 has to be performed simultaneously on both the pattern data CUR_D0 and CUR_D1. That's because the color of each pixel is not determined unless both the shallow bit and the deep bit of each pixel of the cursor pattern CUR_P become available. The reading of the pattern data CUR_D from the cursor memory body 201 to the read port P2 is performed in units of 32 bits in accordance with the reading of the pattern data CUR_D from the cursor memory body 201 to the read/write port P1, for effective use of circuit area.

The read/write port P1 and the read port P2 perform the input/output of the pattern data CUR_D asynchronously and concurrently.

The background-art cursor memory 200 with the above-discussed configuration has the following problem: The control circuit CTL2 controls the cursor memory body 201 and the read circuit 202 through the following steps as shown in FIG. 10 to display one line of cursor pattern CUR_P of FIG. 7:

(A0) Variables i, j and k are initialized (Step S201).

(A1) The control circuit CTL2 sets a column address PY to 0. The cursor memory body 201 reads the 32-bit data stored at the address #0. The read circuit 202 stores the read data into the shift register SR0 (Steps S202 to S204 and S208 to S211).

(A2) The control circuit CTL2 sets to the column address PY to 2. The cursor memory body 201 reads the 32-bit data stored at the address #128. The read circuit 202 stores the read data into the shift register SR1 (Steps S202, S203, S205, S208 to S210, S212 and S213).

(A3) The shift registers SR0 and SR1 output one bit out of the stored 32-bit data in accordance with the clock (Step S214).

(A4) Repeating the operation of Step S214 thirty-one times, the shift registers SR0 and SR1 output all of the stored 32-bit data (Steps S214 to S217).

(A5) The control circuit CTL2 sets the column address PY to 1. The cursor memory body 201 reads the 32-bit data stored at the address #1. The read circuit 202 stores the read data into the shift register SR0 (Steps S202, S203, S206 and S208 to S211).

(A6) The control circuit CTL2 sets the column address PY to 3. The cursor memory body 201 reads the 32-bit data stored at the address #129. The read circuit 202 stores the read data into the shift register SR1 (Steps S202, S203, S207 to S210, S212 and S213).

(A7) The shift registers SR0 and SR1 output one bit out of the stored 32-bit data in accordance with the clock (Step S214).

(A8) Repeating the operation of Step S214 thirty-one times, the shift registers SR0 and SR1 output all of the stored 32-bit data (Steps S214 to S217).

Such a complicated control as described above is disadvantageously required as it is necessary to set to the column address PY to 0,1,2 and 3 in this order. Therefore, the configuration of the control circuit CTL2 becomes more complicated. As to the cursor memory 200 on the whole, its operating speed is limited and its circuit scale is enlarged. Moreover, if the operating speed of the cursor memory can not meet the actually-required one, another circuit is further needed to accommodate the speed differential. cl SUMMARY OF THE INVENTION The present invention is directed to a cursor memory from and to which first pattern data and second pattern data constituting cursor pattern data are read and written. According to a first aspect of the present invention, the cursor memory comprises: a cursor memory body for storing the first and second pattern data; reading means for performing reading of the first and second pattern data from the cursor memory body; and read/write means for performing read and write of the first and second pattern data from and to the cursor memory body. In the cursor memory of the first aspect, the cursor memory body comprises a first bank including a first block for storing low-order bits of the first pattern data and a second block for storing high-order bits of the second pattern data; and a second bank including a third block for storing low-order bits of the second pattern data and a fourth block for storing high-order bits of the first pattern data.

According to a second aspect of the present invention, in the cursor memory of the first aspect, the read/write means comprises a read/write port used for input/output of the first or second pattern data; and a crossbar switch disposed between the read/write port and the cursor memory body, for switching between the high-order bits and the low-order bits depending on whether the first pattern data or the second pattern data should be inputted/outputted through the read/write port.

According to a third aspect of the present invention, in the cursor memory of the second aspect, the crossbar switch is controlled by a read/write address signal for designating an address in the cursor memory body when the read/write means performs the read and write.

According to a fourth aspect of the present invention, in the cursor memory of the first aspect, the read means comprises a read port used for output of the first and second pattern data; and a crossbar switch disposed between the read port and the cursor memory body, for switching between the first pattern data and the second pattern data depending on whether the high-order bits or the low-order bits should be outputted through the read port.

According to a fifth aspect of the present invention, in the cursor memory of the fourth aspect, the crossbar switch is controlled by a read address signal for designating an address in the cursor memory body when the read means performs the read.

According to a sixth aspect of the present invention, in the cursor memory of the fourth aspect, the read means further comprises shift registers disposed between the crossbar switch and the read port, for outputting the first and second pattern data to the read port by bit.

According to a seventh aspect of the present invention, in the cursor memory of the first aspect, the first to fourth blocks are arranged so as to be sequentially designated by an address signal for designating an address in the cursor memory body.

According to an eighth aspect of the present invention, in the cursor memory of the seventh aspect, the read means comprises an incrementer for generating the address signal.

According to a ninth aspect of the present invention, in the cursor memory of the sixth aspect, the read means further comprises a shift-register control counter for controlling the shift register.

According to a tenth aspect of the present invention, in the cursor memory of the ninth aspect, the first to fourth blocks are arranged so as to be sequentially designated by an address signal for designating an address in the cursor memory body, the read means comprises an incrementer for generating the address signal; and a block counter for counting the number of the blocks in the first or second bank, and the shift-register control counter and the incrementer are controlled by the block counter.

According to an eleventh aspect of the present invention, in the cursor memory of the tenth aspect, the read means receives a load signal inputted to the inside of the cursor memory from the outside for requesting the read means to start the read, and the shift-register control counter, the incrementer and the block counter start their respective operations based on the load signal.

According to a twelfth aspect of the present invention, in the cursor memory of the first aspect, the cursor memory body receives a read/write address signal for designating an address in the cursor memory body when the read/write means performs the read and write; and a read address signal for designating an address in the cursor memory body when the read means performs the read, and the read/write address signal and the read address signal are common.

In the cursor memory of the first aspect, with the first and second banks, the read means can make a control to simultaneously read the first and second pattern data. That simplifies the control by the control means, to thereby achieve an efficient use of the circuit area.

In the cursor memory of the second aspect, the operation of the read/write means can be implemented by simply-configured crossbar switch.

The cursor memory of the third aspect achieves the control over the crossbar switch by using the read/write address signal.

In the cursor memory of the fourth aspect, the operation of the read means can be implemented by simply-configured crossbar switch.

The cursor memory of the fifth aspect achieves the control over the crossbar switch by using the read address signal.

The cursor memory of the sixth aspect has only to provide the shift registers between the crossbar switch and the read port since the read means can receive data from the cursor memory body which allows simultaneous reading of the first and second pattern data, instead of sequential read.

The cursor memory of the seventh aspect simplifies the design of the cursor memory.

In the cursor memory of the eighth aspect, the block can be designated by using the simply-configured incrementer since the blocks in each bank are arranged so as to be sequentially designated.

In the cursor memory of the ninth aspect, the shift-register control counter has only to control the shift operation by the number of high-order bits or low-order bits and therefore reduction in circuit area of the counter is achieved.

The cursor memory of the tenth aspect can perform the reading of the cursor pattern data by controlling the shift registers and the incrementer with the block counter.

The cursor memory of the eleventh aspect can start the reading of the cursor pattern data by simply supplying the load signal.

The cursor memory of the twelfth aspect simplifies the design of the cursor memory.

An object of the present invention is to provide an easy-controllable cursor memory.

These and other objects, features, aspects and advantages of the present invention will become more apparent from the following detailed description of the present invention when taken in conjunction with the accompanying drawings.

DESCRIPTION OF THE PREFERRED EMBODIMENTS

The First Preferred Embodiment

Figure 1:
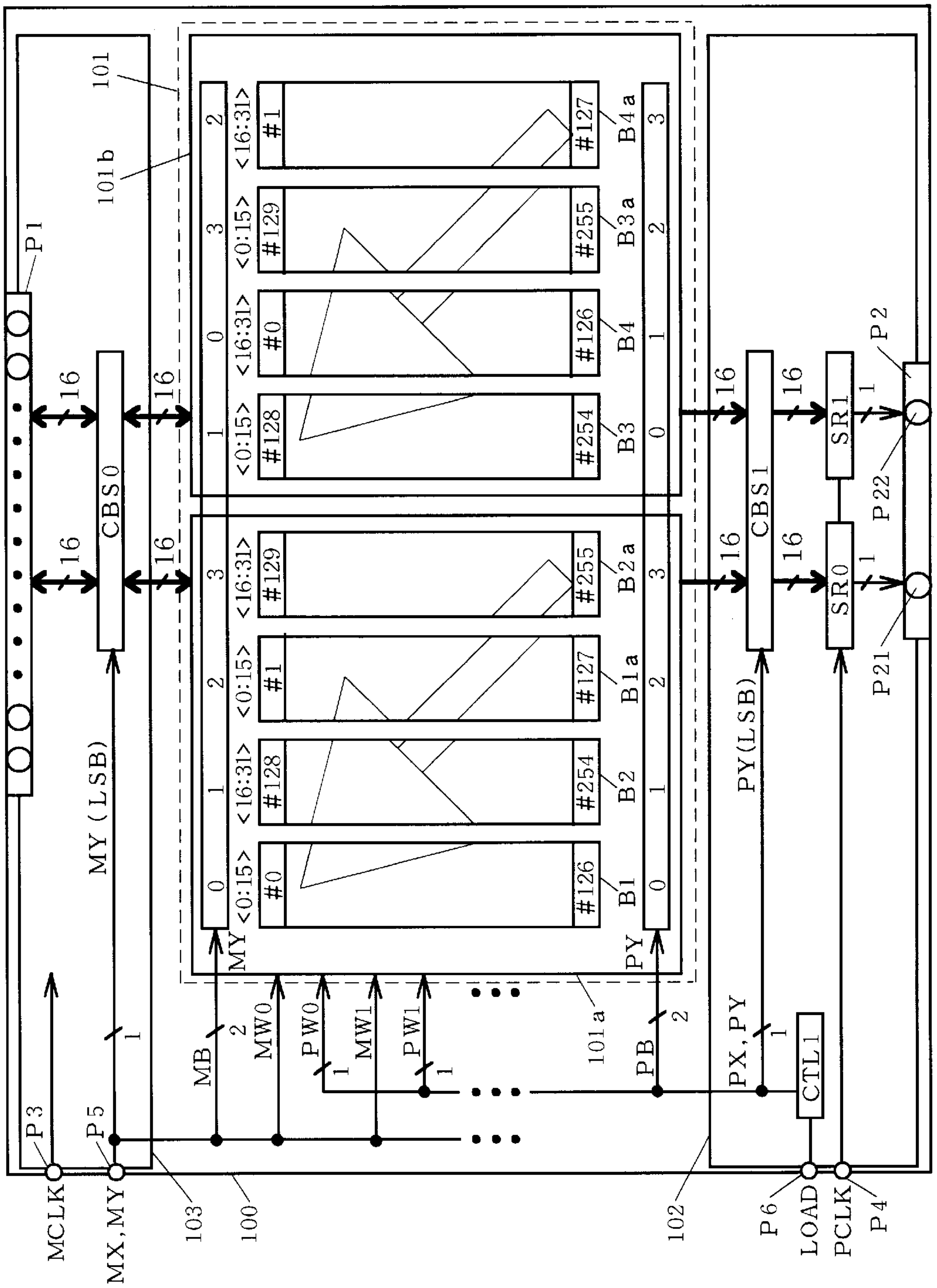
FIG. 1 is a block diagram showing a configuration of a cursor memory of the present invention.

Now, the first preferred embodiment of the present invention will be discussed, using the cursor pattern CUR_P of FIG. 7. FIG. 1 is a block diagram showing a configuration of a cursor memory 100 of the present invention used for the cursor pattern CUR_P. The cursor memory 100 performs read and write of the pattern data CUR_D0 (a first pattern data) and the pattern data CUR_D1 (a second pattern data) constituting data which represent the cursor pattern CUR_P.

The configuration of the cursor memory 100 will be discussed. The cursor memory 100 comprises a cursor memory body 101 for storing the pattern data CUR_D0 and CUR_D1, a reads circuit 102 (read means) for performing read of the pattern data CUR_D0 and CUR_D1 from the cursor memory body 101 and a read/write circuit 103 (read/write means) for performing reads and writes of the pattern data CUR_D0 and CUR_D1 from and to the cursor memory body 101.

A system employing the cursor memory 100 includes an MPU (not shown) and a monitor (not shown). The MPU outputs the pattern data CUR_D to the read/write port P1 to store the data in the cursor memory 100 and receives the pattern data CUR_D from the read/write port P1 to check if the data are correctly stored in cursor memory 100. The cursor pattern CUR_P is displayed on the monitor based on the pattern data CUR_D outputted from the read port P2.

As the pattern data CUR_D are inputted or outputted in units of 32 bits through the read/write port P1, the cursor memory body 101 has such a configuration as follows:

The cursor memory body 101 comprises a bank 101*a* (a first bank) and a bank 101*b* (a second bank).

Figure 2:
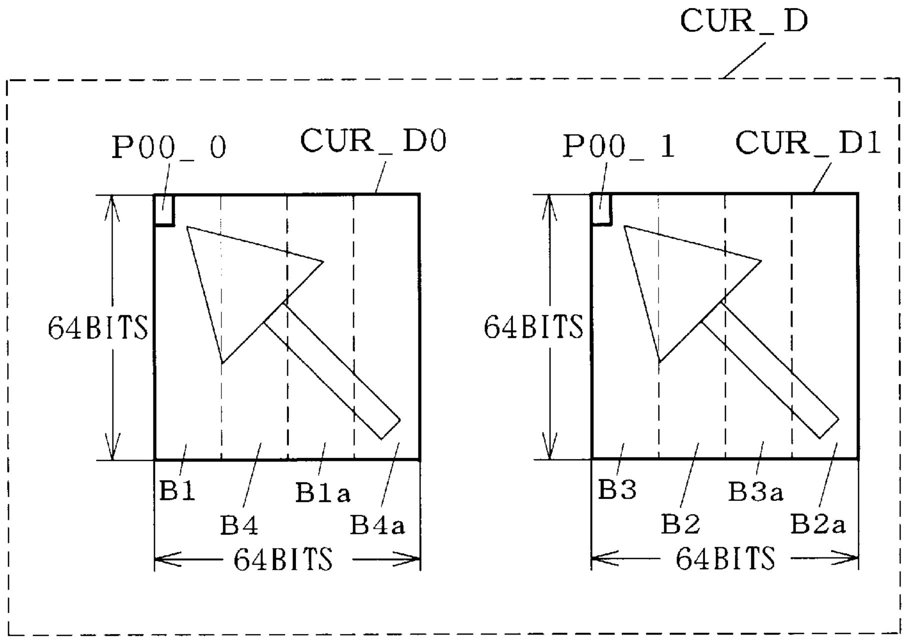
FIG. 2 is a conceptional view showing a structure of pattern data of the present invention.
Figure 8:
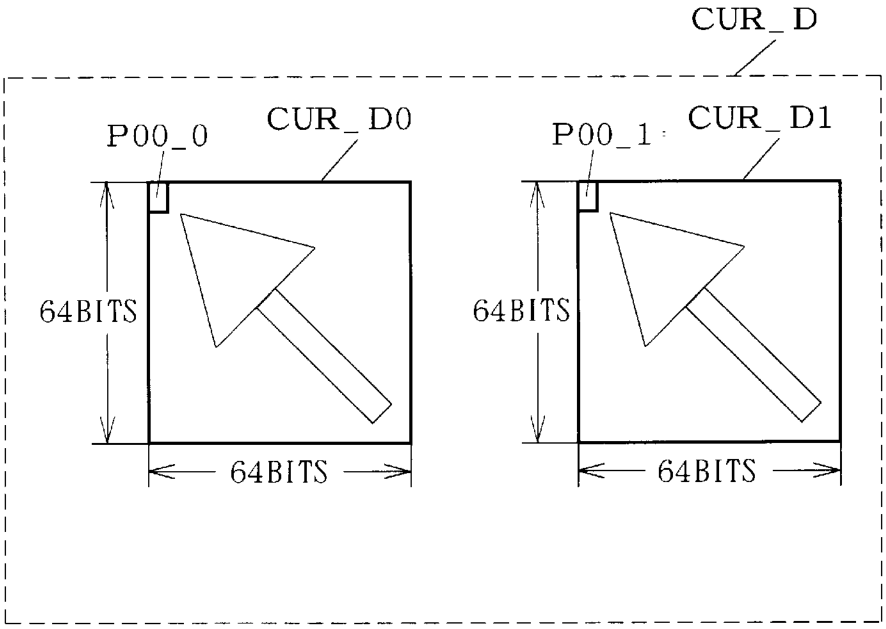
FIG. 8 is a conceptional view showing a structure of pattern data in the background art.

In the first preferred embodiment, the pattern data CUR_D of FIG. 8 are divided into four blocks as shown in FIG. 2. The four blocks are:

① A block B1, B1*a* (a first blocks) for storing the low-order 16 bits (<0:15>) of the pattern data CUR_D0;

② A block B2, B2*a* (a second blocks) for storing the high-order 16 bits (<16:31>) of the pattern data CUR_D1;

③ A block B3, B3*a* (a third blocks) for storing the low-order 16 bits (<0:15>) of the pattern data CUR_D1; and ④ A block B4, B4*a* (a fourth blocks) for storing the high-order 16 bits (<16:31>) of the pattern data CUR_D0.

Figure 9:
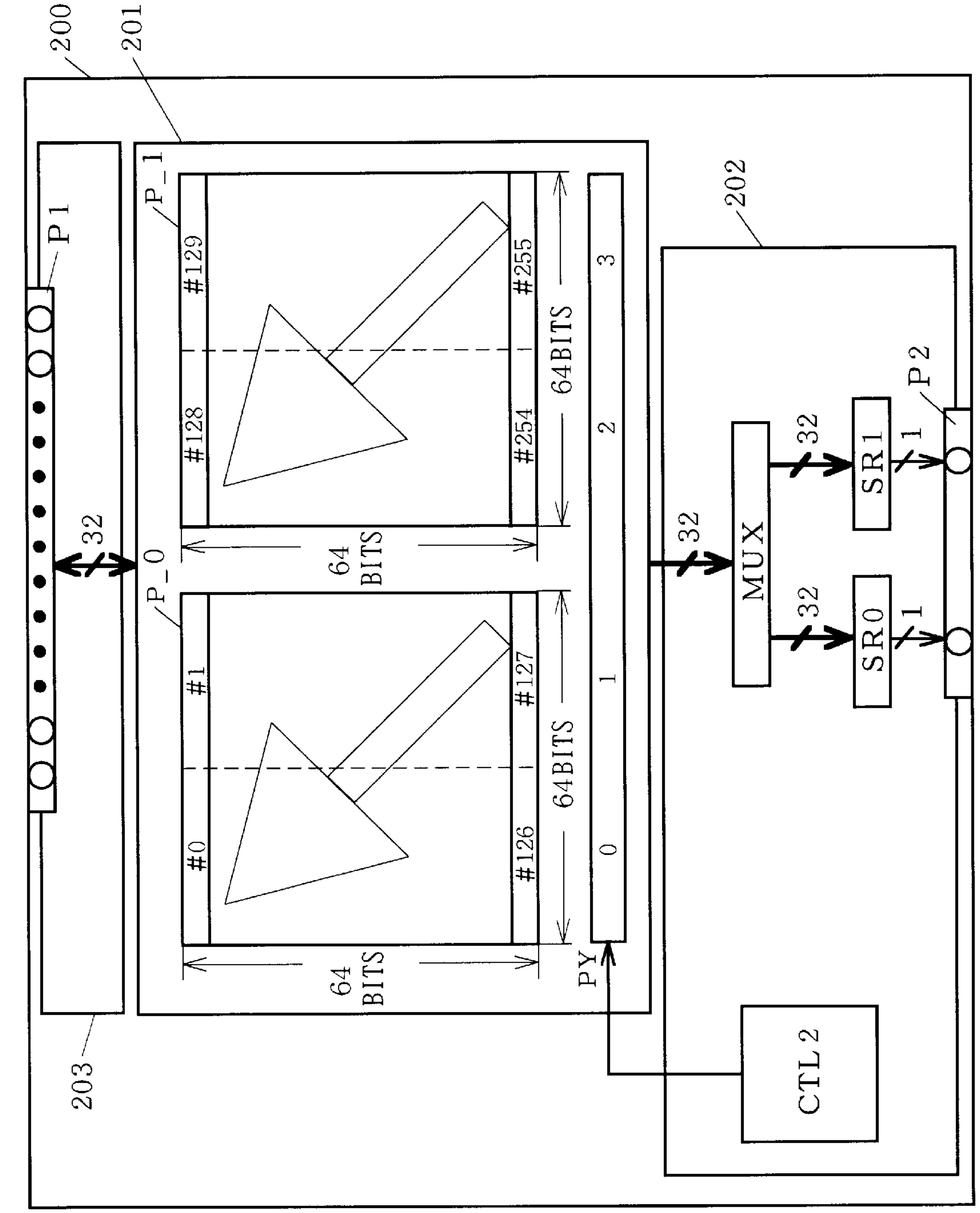
FIG. 9 is a block diagram showing a cursor memory in the background art.

The bank 101*a* includes the block B1, B1*a* and the block B2, B2*a*, and the bank 101*b* includes the block B3, B3*a* and the block B4, B4*a*. The blocks of FIG. 2 correspond to the blocks of FIG. 1. The block B1, B1*a* and the block B4, B4*a* correspond to the plane P_0 of FIG. 9, and the block B2, B2*a* and the block B3, B3*a* correspond to the plane P_1. In each bank, the blocks corresponding to the different planes are alternately arranged.

The cursor memory body 101 receives an address signal for designating an address in the cursor memory body 101. The address signal includes two kinds of address signals (a read/write address signal and a read address signal). The read/write address signal is a signal that designates an address in the cursor memory body 101 when the read/write circuit 103 performs the read and write of data. The read address signal is a signal that designates an address in the cursor memory body 101 when the read circuit 102 performs the read of data.

The read/write address signal includes a row address signal MX and a column address signal MY. The read address signal includes a row address signal PX and a column address signal PY. A word line PWi (i=0 to 63) is a signal line for transferring the row address signal PX from the read circuit 102 to the cursor memory body 101, and a bit line PB is a signal line for transferring the column address signal PY from the read circuit 102 to the cursor memory body 101. A word line MWi (i=0 to 63) is a signal line for transferring the row address signal MX from the read/write circuit 103 to the cursor memory body 101, and a bit line MB is a signal line for transferring the column address signal MY from the read/write circuit 103 to the cursor memory body 101. The column address signal PY is termed a read block selection signal and the column address signal MY is termed a read/write block selection signal.

Thus, the cursor memory body 101 can designate an address (memory cell) in the cursor memory body 101 by using two kinds of address signals. Since the cursor memory 100 integrates an address decoder (not shown), using two kinds of address signals, even if differently defined, causes no problem. Furthermore, the addresses #0 to #255 are given for clear correspondence with those of FIG. 9, and actually the addresses may not be given in this order.

The read circuit 102 comprises the read port P2 used for output of the pattern data CUR_D0 and CUR D1, a crossbar switch CBS1 disposed between the read port P2 and the cursor memory body 101 for switching between the pattern data CUR_D0 and the pattern data CUR_D1 depending on whether the high-order bits or the low-order bits should be outputted through the read port P2 and the shift registers SR0 and SR1 disposed between the crossbar switch CBS1 and the read port P2 for outputting the pattern data CUR_ D0 and CUR D1, respectively, to the read port P2 by bit.

The read circuit 102 further comprises a control circuit CTL1 for controlling the cursor memory body 101 and other elements in the read circuit 102, a port P6 used for input of a load signal LOAD from the outside of the cursor memory 100 to the inside, which requests the read circuit 102 to start the read of data, and a port P4 used for input of a clock PCLK The read port P2 includes terminals P21 and P22 for clear discrimination between the pattern data CUR_D0 and the pattern data CUR_D1. The pattern data CUR_D0 and CUR_D1 are outputted from the terminals P21 and P22, respectively, by bit.

The read circuit 102 outputs the pattern data CUR_D0 and CUR_D1 to the terminals P21 and P22, respectively, by bit. Accordingly, the cursor memory body 101 may fundamentally have a configuration to output the pattern data CUR_D0 and the pattern data CUR_D1 by bit. For effective use of circuit area, however, the cursor memory body 101 has a configuration to output data to read circuit 102 in units of 32 bits (16 bits from the bank 101*a* and 16 bits from the bank 101*b*) in accordance with the 32-bit output to the read/write circuit 103.

Figure 3:
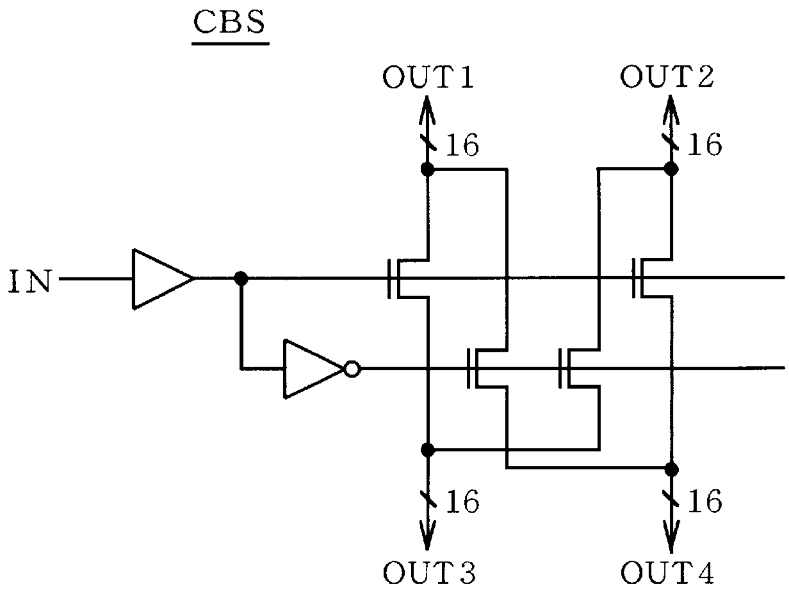
FIG. 3 is a circuit diagram showing an internal configuration of a crossbar switch.

The crossbar switch CBS1 is connected to the cursor memory body 101 and the shift registers SR0 and SR1, and receives the least significant bit LSB of the column address signal PY, thereby being controlled. The internal configuration of the crossbar switch CBS1 is shown in FIG. 3. A terminal IN receives the least significant bit LSB of the column address signal PY. Terminals OUT1, OUT2, OUT3 and OUT4 are connected to the bank 101*b*, the bank 101*a*, the shift register SR0 and the shift register SR1, respectively.

The shift register SR0 receives an output from the crossbar switch CBS1 and the clock PCLK which is inputted to the port P4. The terminal P21 of the read port P2 receives an output from the shift register SR0. The shift register SR1 receives an output from the crossbar switch CBS1 and the clock PCLK which is inputted to the port P4. The terminal P22 of the read port P2 receives an output from the shift register SR1. The control circuit CTL1 receives the load signal LOAD which is inputted to the port P6, and generates the read address signal to output it.

The read/write circuit 103 comprises the read/write port P1 used for input/output of the pattern data CUR_D0 or CUR_D1, a crossbar switch CBS0 disposed between the port P1 and the cursor memory body 101 for switching between the high-order bits and the low-order bits depending on whether the pattern data CUR_D0 or the pattern data CUR_D1 should be inputted/outputted through the read/write port P1, a port P3 used for input of the clock MCLK and a port P5 used for input of the read/write address signals (MX, MY).

The read/write port P1 performs both input and output of the pattern data CUR_D0 or CUR_D1. The read/write port P1 includes 32 terminals. Out of the 32 terminals, a predetermined 16 terminals are used for the high-order bits and another predetermined 16 terminals are used for the low-order bits. Input/output of 32 bits of data is performed through the 32 terminals.

The cursor memory body 101 has a configuration to perform input/output of 32 bits of data (16 bits from the bank 101*a* and 16 bits from the bank 101*b*) at one time.

The crossbar switch CBS0 is connected to the cursor memory body 101 and the read/write port P1, and receives the least significant bit LSB of the column address signal MY, thereby being controlled. The internal configuration of the crossbar switch CBS0 is shown in FIG. 3. A terminal IN receives the least significant bit LSB of the column address signal MY. Terminals OUT1 and OUT2 are connected to the bank 101*a* and the bank 101*b* respectively, and terminals OUT3 and OUT4 are connected to the read/write port P1.

The input/output operation through the read/write port P1 is performed on one of the pattern data CUR_D0 and CUR_D1. In contrast, the output operation through the read port P2 has to be performed on both the pattern data CUR_D0 and CUR_D1. That's because the color of each pixel is not determined unless both the shallow bit and the deep bit of each pixel of the cursor pattern CUR_P become available, as discussed in the background art. The read of the pattern data CUR_D from the cursor memory body 101 to the read port P2 is performed in units of 32 bits in accordance with the read of the pattern data CUR_D from the cursor memory body 101 to the read/write port P1, for effective use of circuit area The read/write port P1 and the read port P2 perform the input/output of the pattern data CUR_D asynchronously and concurrently.

The blocks B1, B2, B1*a* and B2*a* have the column addresses PY of 0, 1, 2 and 3, respectively. Accordingly, the blocks B1, B2, B1*a* and B2*a* can be designated by the column address PY in a sequential order. The same applies to the blocks B3, B4, B3*a* and B4*a*.

Now, an operation of the read/write circuit 103 will be discussed. Discussion starts with a case of a write of the content at #0 of the pattern data CUR_D0 from the read/ write port P1 to the cursor memory body 101. A system outside the cursor memory 100 supplies the port P5 with the read/write address signal corresponding to #0 of the pattern data CUR_D0. With this, an address locating #0 of the block B1 is specified in the bank 101*a*, and an address locating #0 of the block B4 is specified in the bank 101*b*. At this time, the column address signal MY is 0. When the column address signal MY is 0, the least significant signal LSB of the column address signal MY is 0. When the column address signal MY is 0, the cursor memory body 101 selects the blocks B1 and B4. When the least significant bit LSB of the column address signal MY is 0, the crossbar switch CBS0 does not switch between the high-order bits and the low-order bits, and accordingly outputs the low-order 16 bits out of the 32-bit data transferred from the read/write port P1 to the bank 101*a* and the high-order 16 bits out of the 32-bit data from the read/write port P1 to the bank 101*b*.

The cursor memory body 101 writes the low-order 16 bits which are outputted to the bank 101*a* by the crossbar switch CBS0 at an address in the block B1 indicated by the row address signal MX, and at the same time writes the high-order 16 bits which are outputted to the bank 101*b* by the crossbar switch CBS0 at an address in the block B4 indicated by the row address signal MX.

Next, a write of the content at #128 of the pattern data CUR_D1 from the read/write port P1 to the cursor memory body 101 will be discussed. The system outside the cursor memory 100 supplies the port P5 with the read/write address signal corresponding to #128 of the pattern data CUR_D1. With this, an address locating #128 of the block B2 is specified in the bank 101*a*, and an address locating #128 of the block B3 is specified in the bank 101*b*. At this time, the column address signal MY is 1. When the column address signal MY is 1, the least significant signal LSB of the column address signal MY is 1. When the column address signal MY is 1, the cursor memory body 101 selects the blocks B2 and B3. When the least significant bit LSB of the column address signal MY is 1, the crossbar switch CBS0 switches between the high-order bits and the low-order bits, and accordingly outputs the low-order 16 bits out of the 32-bit data transferred from the read/write port P1 to the bank 101*b* and the high-order 16 bits out of the 32-bit data from the read/write port P1 to the bank 101*a*.

The cursor memory body 101 writes the low-order 16 bits which are outputted to the bank 101*b* by the crossbar switch CBS0 at an address in the block B3 indicated by the row address signal MX, and at the same time writes the high-order 16 bits which are outputted to the bank 101*a* by the crossbar switch CBS0 at an address in the block B2 indicated by the row address signal MX.

In a case of a read of the content at #0 of the pattern data CUR_D0 from the cursor memory body 101 to the read/write port P1, operation is performed in reverse order to the write of the content at #0 of the pattern data CUR_D0 from the read/write port P1 to the cursor memory body 101, to output the content at #0 of the pattern data CUR_D0 to the read/write port P1. In a case of a read of the content at #128 of the pattern data CUR_D1 from the cursor memory body 101 to the read/write port P1, the operation is performed in reverse order to the write of the content at #128 of the pattern data CUR_D1 from the read/write port P1 to the cursor memory body 101, to output the content at #128 of the pattern data CUR_D1 to the read/write port P1.

Thus, the crossbar switch CBS0 switches between the high-order bits and the low-order bits depending on whether the pattern data CUR_D0 or CUR_D1 should be inputted/outputted through the read/write port P1. Further, the crossbar switch CBS0 is controlled by the read/write address signal for designating the address in the cursor memory body 101.

Now, an operation of the read circuit 102 will be discussed. Discussion starts with a case of a read of the content at #0 of the pattern data CUR_D0 and the content at #128 of the pattern data CUR_D1 from the cursor memory body 101 to the read port P2. The control circuit CTL1 outputs the read address signal designating the address locating #0 in the bank 101*a*. This read address signal also designates the address locating #128 in the bank 101*b*. At this time, the column address signal PY is 0. When the column address signal PY is 0, the least significant signal LSB of the column address signal PY is 0. When the column address signal PY is 0, the cursor memory body 101 selects the blocks B1 and B3. The cursor memory body 101 reads the low-order 16 bits of the pattern data CUR_D0 stored at an address in the block B1 indicated by the row address signal PX, and at the same time reads the low-order 16 bits of the pattern data CUR_D1 stored at an address in the block B3 indicated by the row address signal PX.

When the least significant bit LSB of the column address signal PY is 0, the crossbar switch CBS1 does not switch between the pattern data CUR_D0 and pattern data CUR_D1, and accordingly outputs the low-order 16 bits of the pattern data CUR_D0 read out from the bank 101*a* to the shift register SR0 and the low-order 16 bits of the pattern data CUR_D1 read out from the bank 101*b* to the shift register SR1. The shift register SR0 stores the low-order 16 bits of the pattern data cure_D0 outputted from the crossbar switch CBS1 and thereafter outputs the 16 bits of data by bit in accordance with the clock PCLK transferred from the port P4. Concurrently with this, the shift register SR1 stores the low-order 16 bits of the pattern data CUR_D1 outputted from the crossbar switch CBS1 and thereafter outputs the 16 bits of data by bit in accordance with the clock PCLK transferred from the port P4.

After that, the control circuit CTL1 further outputs the read address signal designating the address locating #128 in the bank 101*a*. This read address signal also designates the address locating #0 in the bank 101*b*. At this time, the column address signal PY is 1. When the column address signal PY is 1, the least significant signal LSB of the column address signal PY is 1. When the column address signal PY is 1, the cursor memory body 101 selects the blocks B2 and B4. The cursor memory body 101 reads the high-order 16 bits of the pattern data CUR_D1 stored at an address in the block B2 indicated by the row address signal PX, and at the same time reads the high-order 16 bits of the pattern data CUR_D0 stored at an address in the block B4 indicated by the row address signal PX.

When the least significant bit LSB of the column address signal PY is 1, the crossbar switch CBS1 switches between the pattern data CUR_D0 and pattern data CUR_D1, and accordingly outputs the high-order 16 bits of the pattern data CUR_D1 read out from the bank 101*a* to the shift register SR1 and the high-order 16 bits of the pattern data CUR_D0 read out from the bank 101*b* to the shift register SR0. The shift register SR0 stores the high-order 16 bits of the pattern data CUR_D0 outputted from the crossbar switch CBS1 and thereafter outputs the 16 bits of data by bit in accordance with the clock PCLK transferred from the port P4. Concurrently with this, the shift register SR1 stores the high-order 16 bits of the pattern data CUR_D1 outputted from the crossbar switch CBS1 and thereafter outputs the 16 bits of data by bit in accordance with the clock PCLK transferred from the port P4.

Thus, the crossbar switch CBS1 switches between the pattern data CUR_D0 and the pattern data CUR_D1 depending on whether the high-order bits or the low-order bits should be outputted through the read port P2. Further, the crossbar switch CBS1 is controlled by the read address signal for designating the address in the cursor memory body 101.

Figure 4:
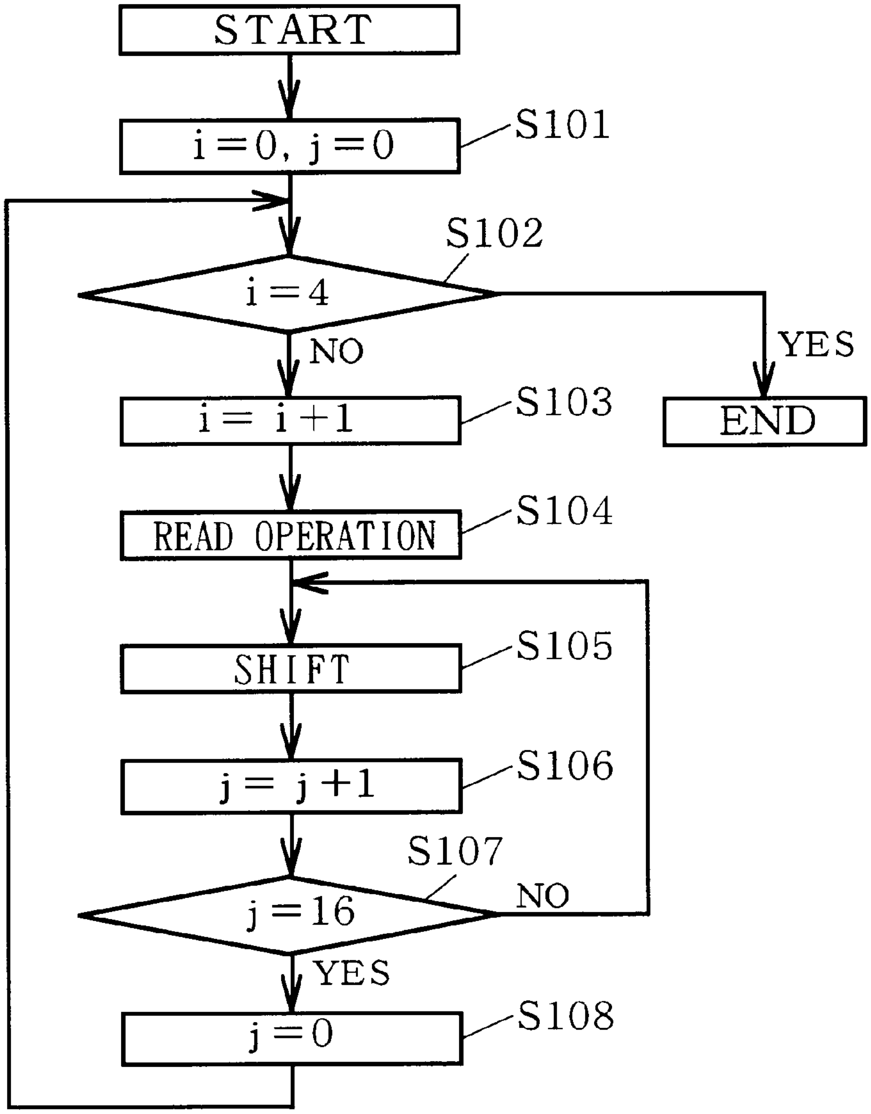
FIG. 4 is a flow chart showing an operation of the cursor memory of the present invention.
Figure 7:
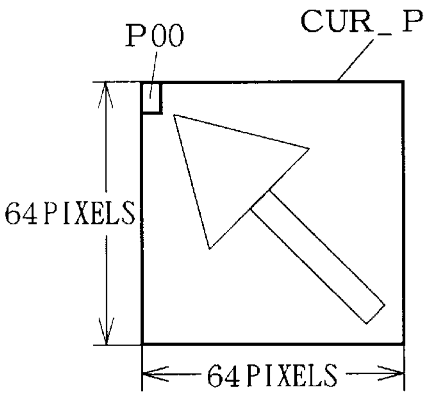
FIG. 7 illustrates a typical example of cursor pattern.

The control circuit CTL1 controls the cursor memory body 101 and the read circuit 102 through the following steps as shown in FIG. 4, to display one line of the cursor pattern CUR_P of FIG. 7:

(B0) Variables i and j are initialized (Step S101).

(B1) The control circuit CTL1 sets the column address signal PY to 0. The cursor memory body 101 reads the low-order 16 bits stored at the address locating #0 in the bank 101*a* and those at the address locating #128 in the bank 101*b*. The read circuit 102 stores the low-order 16 bits read from the bank 101*a* and those from the bank 101*b* into the shift registers SR0 and SR1, respectively (Steps S102 to S104).

(B2) The shift registers SR0 and SR1 output the respective low-order 16 bits stored therein by bit in accordance with the clock PCLK (Steps S105 to S108).

(B3) The control circuit CTL1 sets the column address signal PY to 1. The cursor memory body 101 reads the high-order 16 bits stored at the address locating #128 in the bank 101_a_ and those at the address locating #0 in the bank 101_b_. The read circuit 102 stores the high-order 16 bits read from the bank 101_b_ and those from the bank 101_a_ into the shift registers SR0 and SR1, respectively (Steps S102 to S104).

(B4) The shift registers SR0 and SR1 output the respective high-order 16 bits stored therein by bit in accordance with the clock PCLK (Steps S105 to S108).

(B5) The control circuit CTI sets the column address signal PY to 2. The cursor memory body 101 reads the low-order 16 bits stored at the address locating #1 in the bank 101_a_ and those at the address locating #129 in the bank 101_b_. The read circuit 102 stores the low-order 16 bits read from the bank 101_a_ and those from the bank 101_b_ into the shift registers SR0 and SR1, respectively (Steps S102 to S104).

(B6) The shift registers SR0 and SR1 output the respective low-order 16 bits stored therein by bit in accordance with the clock PCLK (Steps S105 to S108).

(B7) The control circuit CTL1 sets the column address signal PY to 3. The cursor memory body 101 reads the high-order 16 bits stored at the address locating #129 in the bank 101_a_ and those at the address locating #1 in the bank 101_b_. The read circuit 102 stores the high-order 16 bits read from the bank 101_b_ and those from the bank 101_a_ into the shift registers SR0 and SR1, respectively (Steps S102 to S104).

(B8) The shift registers SR0 and SR1 output the respective high-order 16 bits stored therein by bit in accordance with the clock PCLK (Steps S105 to S108).

Figure 10:
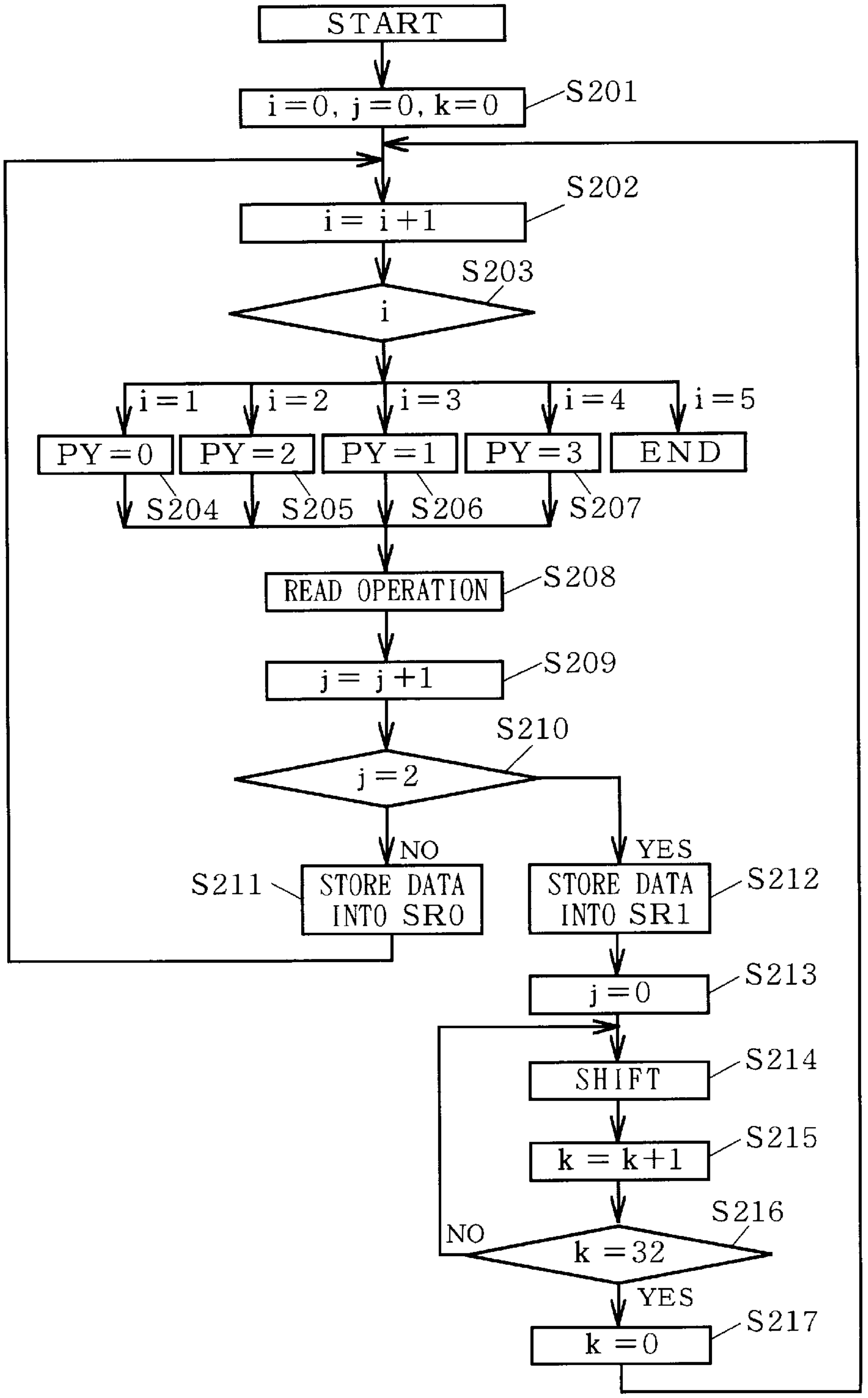
FIG. 10 is a flow chart showing an operation of the cursor memory in the background art.

Thus, the control circuit CTL1 performs much simpler control than that through the steps of FIG. 10, to set the column address in the sequential order of 0, 1, 2 and 3. Specifically, the control circuit CTL1 has only to repeat the steps (B1) and (B2) four times while the incrementing the column address PY. In other words, it is possible to implement the desired operation essentially through the increment of the column address PY and the steps (B1) and (12). Furthermore, though the background art needs a check to determine if both the data in the shift registers SR0 and SR1 are available, the first preferred embodiment does not need that check because the data in the shift registers SR0 and SR1 become available at the same time.

The first preferred embodiment produces the following effect: Simple control results in simplicity in configuration of the control circuit CTL1. That allows improvement in operating speed of the cursor memory 100 and reduction in circuit scale.

The Second Preferred Embodiment

Now, the second preferred embodiment will be discussed. This preferred embodiment relates to the internal configuration of the control circuit CTL1 of FIG. 1. Receiving the load signal LOAD which is inputted to the port P6, the cursor memory 100 reads the pattern data CUR_D from the cursor memory body 101. The load signal LOAD is a signal supplied from the system to display the cursor pattern CUR_P on the monitor.

Figure 5:
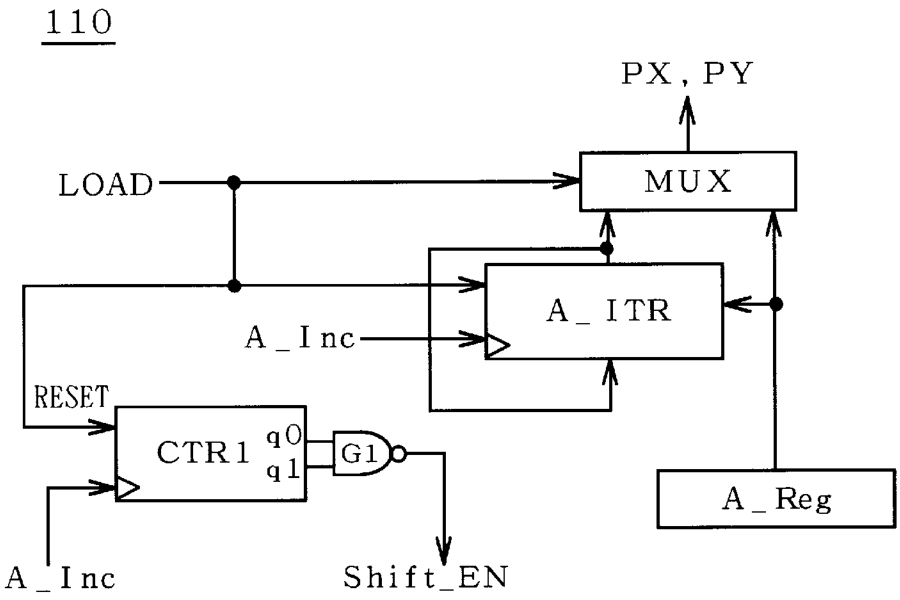
FIG. 5 is a block diagram showing an internal configuration of an address-signal generation circuit.
Figure 6:
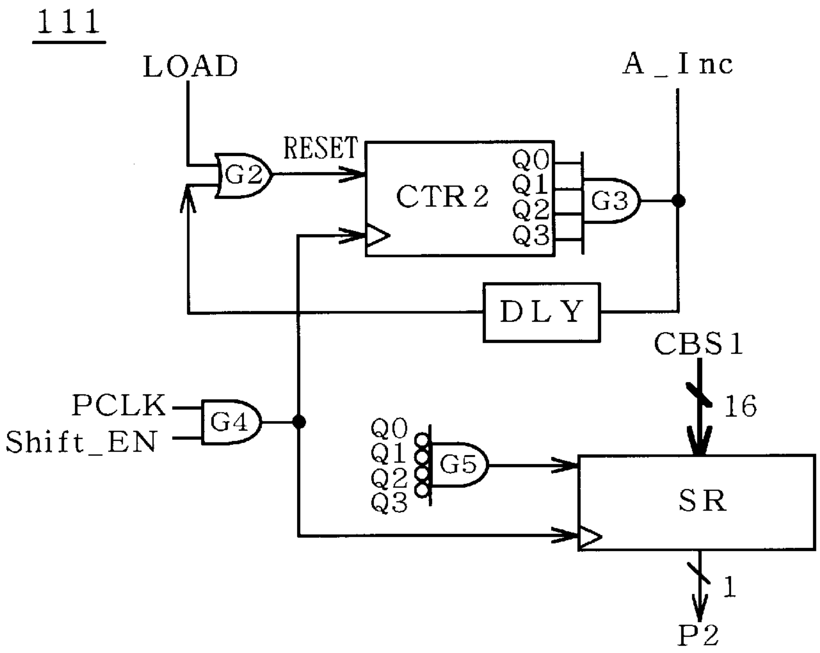
FIG. 6 is a block diagram showing an internal configuration of a shift-register control circuit.

The control circuit CTL1 includes an address-signal generation circuit 110 and a shift-register control circuit 111. The internal configuration of the address-signal generation circuit 110 is shown in FIG. 5. The internal configuration of the shift-register control circuit 111 is shown in FIG. 6. The reference sign SR of FIG. 6 represents the shift register SR0 or SR1 of FIG. 1. The address-signal generation circuit 110 includes an address incrementer A_ITR for generating the read address signals (PX, PY) and a block counter CTR1 which is a 2-bit counter for counting the number of blocks in the bank 101_a_ or 101_b_. The shift-register control circuit 111 includes a shift-register control counter CTR2 which is a 4-bit counter for controlling the shift registers SR0 and SR1.

Operations of the address-signal generation circuit 110 and the shift-register control circuit 111 will be discussed, with reference to FIGS. 5 and 6. The address-signal generation circuit 110 and the shift-register control circuit 111 start their operations based on the load signal LOAD. First, an operation in accordance with the load signal LOAD of high level will be discussed. The load signal LOAD is high level only for the first one clock of the clock PCLKY An address register A_Reg stores an address value of the block designated by the column address signal PY. Receiving the load signal LOAD of high level, the multiplexer MUX selects the address value stored in the address register A_Reg as an initial value of the address and outputs the address value as the read address signal (PX, PY). Receiving the load signal LOAD of high level, the block counter CTR1 resets itself and outputs a signal of low level to output terminals q0 and q1. Receiving the load signal LOAD of high level, the address incrementer A_ITR stores the initial value in address which is stored of the address register A_Reg. Receiving the load signal LOAD of high level through an OR circuit G2, the shift-register control counter CTR2 resets itself and outputs a signal of low level to terminals Q0 to Q3. A negative-input AND circuit G5 outputs a signal of high level to the shift register SR only when the signal of low level is supplied to the output terminals Q0 to Q3. Receiving the signal of high level, the shift register SR stores the 16-bit data outputted from the crossbar switch CBS1 therein.

Secondly, an operation in a change of the load signal LOAD from high level into low level will be discussed. Receiving the load signal LOAD of low level, the multiplexer MUX selects the address value stored in the address incrementer A_ITR and outputs the address value as the read address signal (PX, PY). When the load signal LOAD changes from high level into low level, the block counter CTR1 releases the reset of itself and keeps outputting a signal of low level to the output terminals q0 and q1. Therefore, a NAND circuit G1 outputs an enable signal Shift_EN of high level. When the load signal LOAD changes from high level into low level, the shift-register control counter CTR2 releases the reset of itself. An AND circuit G4 outputs the clock signal PCLK since the enable signal Shift_EN is high level.

Thirdly, an operation in accordance with the load signal LOAD of low level will be discussed. The shift-register control counter CTR2 performs a count every time when receives the clock PCLK from the AND circuit G4, and outputs the count value to the output terminals Q0 to Q3. The shift register SR outputs the 16-bit data stored therein by bit every time when receives the clock PCLK from the AND circuit G4. Accordingly, the shift-register control counter CTR2 performs the counting of the number of outputs of 1-bit data from the shift register SR.

Finally, an operation at the time when all the output terminals Q0 to Q3 reach a high level as the result of the count by the shift-register control counter CTR2 will be discussed. At this time, receiving the clock PCLK sixteen times, the shift register SR has outputted all the 16 bits of data stored therein. The AND circuit G3 outputs an address increment signal A_Inc of high level. Receiving the address increment signal A_Inc of high level, the address incrementer A_ITR adds 1 to the address value stored therein. The multiplexer MUX selects the address value stored in the address incrementer A_ITR and outputs the address value as the read address signal (PX, PY). Therefore, the cursor memory body 101 of FIG. 1 reads the content at the address designated by the read address signal (PX, PY) and outputs the content to the crossbar switch CBS1. The block counter CTR1 performs a count every time it receives the address increment signal A_Inc of high level, and outputs the count value to the output terminals q0 and q1.

A delay element DLY receives the address increment signal A_Inc of high level and outputs the address increment signal A_Inc of high level one cycle of the clock PCLK after that. Accordingly, since the OR circuit G2 outputs a signal of high level, the shift-register control counter CTR2 resets itself and outputs a signal of low level to the output terminals Q0 to Q3. At this time, as the negative-input AND circuit G5 outputs a signal of high level, the shift register SR stores the 16-bit data outputted from the crossbar switch CBS1. The AND circuit G3 outputs a signal of low level. The delay element DLY receives the address increment signal A_Inc of low level and outputs the address increment signal A_Inc of low level one cycle of the clock PCLK after that. Accordingly, since the OR circuit G2 outputs a signal of low level, the shift-register control counter CTR2 releases the reset of itself and restart the count in accordance with the clock PCLK.

After that, the address-signal generation circuit 110 and the shift-register control circuit 111 repeat the same operations as above. When both the signals at the output terminals q0 and q1 of the block counter CTR1 become a high level, the NAND circuit G1 outputs the enable signal Shift_EN of low level. When the enable signal Shift_EN becomes a low level, the shift-register control counter CTR2 and the shift register SR stop their operations.

Thus, the block counter CTR1 controls the shift-register control counter CTR2 and the shift register SR (SR0, SR1) to repeat their operations four times. Therefore, continuous read of a row of 128-bit data of the cursor pattern CUR_P can be achieved. Furthermore, the shift-register control counter CTR2 and the address incrementer A_ITR are controlled by the block counter CTR1.

The second preferred embodiment produces the following effect: Automatic increment of address is implemented by using counters. Further, the control circuit CTL1 can read the cursor data CUR_D from the cursor memory body 101 by simply receiving the load signal LOAD. Therefore, the circuit configuration of the control circuit CTL1 becomes much simpler than that of the background-art control circuit CTL2. That allows improvement in operating speed of the cursor memory 100 and reduction in area.

The Third Preferred Embodiment

As discussed in the first preferred embodiment, the read/write circuit 103 needs address information on the pattern data CUR_D0 and CUR_D1 and the read circuit 102 needs address information on the high-order bits and low-order bits. Thus, the read/write circuit 103 and the read circuit 102 need different address informations. It is a complicated work for a designer of the cursor memory 100 to use the read/write address signal for the read/write circuit 103 and the read address signal for the read circuit 102 which are different. Using the read/write address signal and the read address signal which are different would require a complex and large-scaled address decoder.

In order to avoid complexity and enlargement of the address decoder, it is necessary to use the read/write address signal and the read address signal which are as common as possible. That allows a common use of an address decoder to the read/write circuit 103 and the read circuit 102.

Further, for example, it is generally prohibited to make a simultaneous access to the same memory cell for the write of the pattern data CUR_D from the read/write port P1 to the cursor memory body 101 and the read of the pattern data CUR_D from the cursor memory body 101 to the read port P2. If the read/write address signal and the read address signal are common, it is easy to judge whether or not access is made to the same memory cell in the cursor memory body 101 for the write and the read of the cursor pattern data CUR_D.

Discussion will be made below on how the read/write address signal and the read address signal are common. The read/write address signal consists of signals MY<0>, MY<1>, MX<0:5> in the order from the least significant bit LSB to the most significant bit MSB. The signals MY<0> and MY<1> constitute a 2-bit column address MY and the signal MX<0:5> is a 6-bit row address MX. The read address signal consists of signals PY<0>, PY<1>, PX<0:5> in the order from the least significant bit LSB to the most significant bit MSB. The signals PY<0> and PY<1> constitute a 2-bit column address PY and the signal PX<0:5> is a 6-bit row address PX.

The row address signals MX<0:5> and PX<0:5> are made common and the column address signals MY<1> and PY<1> are made common. Through this commonality, when the read address signal and the read/write address signal specify the same memory cell in the cursor memory body 101, the row address signals MX<0:5> and PX<0:5> have the same value and the column address signals MY<1> and PY <1> have the same value.

The column address signals MY<1> and PY<0> are not made common. That's because the column address signal MY<0> is used for specifying one of the pattern data CUR_D0 or CUR_D1 and the column address signal PY<0> is used for specifying one of the high-order bits or the low-order bits.

Since the signals PY<0> and PY<1> which are located in this order from the least significant bit LSB constitute the column address PY, the blocks in the cursor memory body 101 are automatically designated in sequence by simply incrementing the column address PY (PY<0> and PY<1>) by one.

The third preferred embodiment produces an effect of simplicity in configuration of the address decoder by making the read/write address signal and the read address signal common.

While the invention has been shown and described in detail, the foregoing description is in all aspects illustrative and not restrictive. It is therefore understood that numerous modifications and variations can be devised without departing from the scope of the invention.

I claim:

1. A cursor memory from and to which first pattern data and second pattern data constituting cursor pattern data are read and written, comprising:

a cursor memory body for storing said first and second pattern data;

read means for performing read of said first and second pattern data from said cursor memory body; and read/write mean for performing read and write of said first and second pattern data from and to said cursor memory body, wherein said cursor memory body comprises a first bank including a first block for storing low-order bits of said first pattern data and a second block for storing high-order bits of said second pattern data; and a second bank including a third block for storing low-order bits of said second pattern data and a fourth block for storing high-order bits of said first pattern data, and wherein order of access to the blocks of said first and second banks is determined by whether the access to the banks is through the read/write means or the read means.

2. The cursor memory of claim 1, wherein said read/write means comprises a read/write port used for input/output of said first or second pattern data; and a crossbar switch disposed between said read/write port and said cursor memory body, for switching between said high-order bits and said low-order bits depending on whether said first pattern data or said second pattern data should be inputted/outputted through said read/write port.

3. The cursor memory of claim 2, wherein said crossbar switch is controlled by a read/write address signal for designating an address in said cursor memory body when said read/write means performs said read and write.

4. The cursor memory of claim 1, wherein said read means comprises a read port used for output of said first and second pattern data; and a crossbar switch disposed between said read port and said cursor memory body, for switching between said first pattern data and said second pattern data depending on whether said high-order bits or said low-order bits should be outputted through said read port.

5. The cursor memory of claim 4, wherein said crossbar switch is controlled by a read address signal for designating an address in said cursor memory body when said read means performs said read.

6. The cursor memory of claim 4, wherein said read means further comprises shift registers disposed between said crossbar switch and said read port, for outputting said first and second pattern data to said read port by bit.

7. The cursor memory of claim 1, wherein said first to fourth blocks are so arranged as to be sequentially designated by an address signal for designating an address in said cursor memory body.

8. The cursor memory of claim 7, wherein said read means comprises an incrementer for generating said address signal.

9. The cursor memory of claim 6, wherein said read means further comprises a shift-register control counter for controlling said shift register.

10. The cursor memory of claim 9, wherein said first to fourth blocks are so arranged as to be sequentially designated by an address signal for designating an address in said cursor memory body, said read means comprises an incrementer for generating said address signal; and a block counter for counting the number of said blocks in said first or second bank, and wherein said shift-register control counter and said incrementer are controlled by said block counter.

11. The cursor memory of claim 10, wherein said read means receives a load signal inputted to the inside of said cursor memory from the outside for requesting said read means to start said read, and said shift-register control counter, said incrementer and said block counter start their respective operations based on said load signal.

12. The cursor memory of claim 1, wherein said cursor memory body receives a read/write address signal for designating an address in said cursor memory body when said read/write means performs said read and write; and a read address signal for designating an address in said cursor memory body when said read means performs said read, and wherein said read/write address signal and said read address signal are common.

13. The cursor memory of clam 1, wherein said read means outputs simultaneously said low-order bits in said first block and said low-order bits in said third block, and outputs simultaneously said high-order bits in said second block and said high-order bits in said fourth block.

14. The cursor memory of claim 1, wherein the combination of the first and second pattern data determines a way of displaying each pixel.

15. The cursor memory of claim 1, wherein the combination of the first and second pattern data determines a unique color for each pixel.

16. The cursor memory of claim 14, wherein the combination of the first and second pattern data determines a unique color for each pixel.

* * * * *